(12) United States Patent
Murray

(10) Patent No.: US 8,688,602 B1
(45) Date of Patent: Apr. 1, 2014

(54) METADATA GENERATION BASED UPON EXTRACTION OF INFORMATION FROM FULL TEXT OF BOOKS

(75) Inventor: Abraham Phelps Murray, Scituate, MA (US)

(73) Assignee: Google Inc., Mountain View, CA (US)

( * ) Notice: Subject to any disclaimer, the term of this patent is extended or adjusted under 35 U.S.C. 154(b) by 283 days.

(21) Appl. No.: 13/400,994

(22) Filed: Feb. 21, 2012

(51) Int. Cl.
*G06F 15/18* (2006.01)

(52) U.S. Cl.
USPC ............................................................ 706/12

(58) Field of Classification Search
USPC ............................................................ 706/12
See application file for complete search history.

(56) References Cited

U.S. PATENT DOCUMENTS

| | | | |
|---|---|---|---|
| 7,519,200 B2 | 4/2009 | Gokturk et al. | |
| 7,657,100 B2 | 2/2010 | Gokturk et al. | |
| 7,657,126 B2 | 2/2010 | Gokturk et al. | |
| 7,660,468 B2 | 2/2010 | Gokturk et al. | |
| 7,760,917 B2 | 7/2010 | Vanhoucke et al. | |
| 7,783,135 B2 | 8/2010 | Gokturk et al. | |
| 7,809,192 B2 | 10/2010 | Gokturk et al. | |
| 7,809,722 B2 | 10/2010 | Gokturk et al. | |
| 7,945,099 B2 | 5/2011 | Gokturk et al. | |
| 8,014,573 B2 * | 9/2011 | Boomer et al. | 382/118 |
| 8,069,173 B2 * | 11/2011 | Munekuni et al. | 707/736 |
| 8,112,420 B2 * | 2/2012 | Yamamoto et al. | 707/736 |
| 8,136,140 B2 * | 3/2012 | Hodge | 725/88 |
| 8,301,884 B2 * | 10/2012 | Choi | 713/168 |
| 8,321,456 B2 * | 11/2012 | Barbieri et al. | 707/771 |
| 8,352,479 B2 * | 1/2013 | Bedingfield, Sr. | 707/755 |
| 8,386,926 B1 * | 2/2013 | Matsuoka | 715/256 |
| 8,438,485 B2 * | 5/2013 | Kulis et al. | 715/727 |
| 8,543,932 B2 * | 9/2013 | Fields et al. | 715/762 |
| 8,548,243 B2 * | 10/2013 | Tsunokawa et al. | 382/181 |
| 8,555,071 B2 * | 10/2013 | Choi | 713/176 |
| 8,595,756 B2 * | 11/2013 | Tschernutter et al. | 725/4 |

* cited by examiner

*Primary Examiner* — Michael B Holmes
(74) *Attorney, Agent, or Firm* — Fenwick & West LLP

(57) ABSTRACT

A computer system and method generate new metadata associated with a book from existing data about the book, including the body text of the book. The existing data is analyzed to determine input data for a machine learning algorithm, including lexicographical data determined from the body text. The machine learning algorithm is applied by a processor and generates new metadata, and a correspondence between the new metadata and the book is recorded.

37 Claims, 3 Drawing Sheets

METADATA GENERATION BASED UPON EXTRACTION OF INFORMATION FROM FULL TEXT OF BOOKS

BACKGROUND

1. Field of Invention

The disclosure generally relates to the field of improving user experience with books in a digital environment, and more specifically to the generation of new types of metadata that provides a user with more intuitive and meaningful information about a book.

2. Background Information

Existing systems store metadata relating to media objects (e.g., books, songs, images, etc.) and present these data to users in order to convey information about the individual media objects. For example, GOOGLE EBOOKSTORE™ includes metadata tags for books associating each one with genres, as well as indicating included features (such as flowing text), to assist a user in determining if the book is of interest, and if it is appropriate for the user device(s) on which the user wishes to read the electronic book.

Such metadata is highly valuable in assisting users to determine whether to download a particular media object. However, such metadata is assigned manually by vendors, publishers and authors (collectively suppliers) of media objects. Suppliers and users alike would benefit from a system for automatically generating metadata based on characteristics of the media object, existing metadata, and usage statistics. This would enable a far richer tapestry of information to be supplied through metadata without unduly burdening suppliers. The potential benefits for users of such a system are two-fold. Firstly, the users will be provided with more detailed information about the media object when determining whether it is of interest to them. Secondly, the reduced administrative burden on suppliers with regards to metadata creation should result in reduced costs for media objects.

SUMMARY

A system, a method and a computer program product are disclosed for automatically generating metadata that corresponds to a media object. In one aspect, input data relating to the media object is determined, based on the content of the media object. A machine learning algorithm is applied to the input data to generate new metadata and a correspondence between the new metadata and the media object is recorded.

In other aspects, the media object is a book. In one such aspect, the content of the media object is the body text of the book, and the input data is determined from lexicographical data obtained from the body text. In a further aspect, the lexicographical data is one or more scores determined by comparing how many times one or more words appear in the body text with how many times those words appear in a literature corpus.

In various aspects, the new metadata is one or more of: the proportion of users that complete the book after starting it, the average amount of time it takes users to complete the book, the average amount of time users spend reading the book in a single sitting, and the average number of sittings it takes for users to complete the book.

In yet another aspect, feedback is collected relating to the correspondence determined between the media object and the new metadata. The recorded correspondence is modified responsive to the feedback. Feedback is provided by an administrator and/or end users. In a further aspect, recorded correspondence between the media object and the new feedback is removed if more than a threshold proportion of the feedback indicates the correspondence is incorrect.

In yet further aspects, the input data also includes information determined by analyzing existing metadata already associated with the media object. In some such aspects, the existing metadata comprises at least one of: user behavior data and market data. In one such aspect, market data includes information regarding at least one of: inclusion of the media object in a library catalogue, purchase of the media object as a gift, the media object's presence on a current popularity chart, sharing of the media object on social networking sites, and a metric indicating a level of discussion of the media object.

DETAILED DESCRIPTION

The drawings and the following description relate to specific embodiments by way of illustration only. It should be noted that from the following discussion, alternative embodiments of the structures and methods disclosed herein will be readily recognized as viable alternatives that may be employed without departing from the principles of what is claimed.

System Overview

Figure 1:
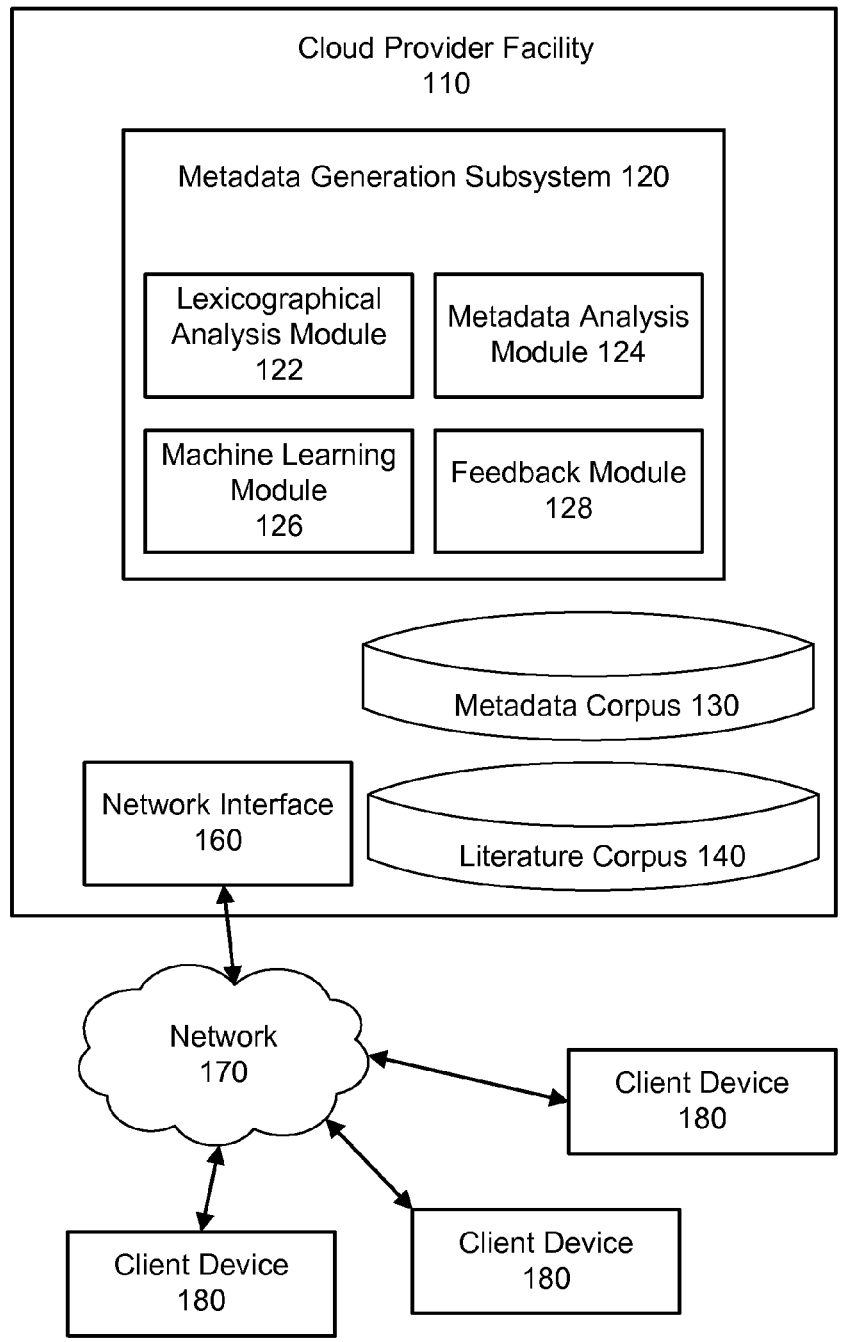
FIG. 1 is a high-level block diagram of a networked computing environment, according to one embodiment.

FIG. 1 shows a networked computing environment 100 including a cloud provider facility 110 and a plurality of client devices 180 (of which three are shown, for exemplary purposes). In the embodiment shown, the cloud provider facility 110 includes a network interface 160, a literature corpus 140, a metadata corpus 130, and a metadata generation subsystem 120, with the metadata generation subsystem being made up of a lexicographical analysis module 122, a metadata analysis module 124, a machine learning module 126, and a feedback module 128.

The literature corpus 140 comprises one or more data storage devices that hold a collection of electronic books that are available for access from client devices 180. Similarly, the metadata corpus 130 is one or more data storage devices (which may be the same devices that make up the literature corpus) that hold metadata corresponding to electronic books in the literature corpus 140. As used herein, the term electronic book should be taken to encompass all forms of digital text, including, but not limited to; electronic books, electronic magazines, electronic newspapers, and any other such entity which includes text displayed on an electronic reading device. In some embodiments, metadata is embedded in electronic books, thus creating significant overlap between the metadata corpus 130 and the literature corpus 140. However, the term metadata is used herein to encompass all data corresponding to a book that is available in the computing environment in which the methods and systems described herein are implemented.

The metadata generation subsystem 120 generates new metadata based on input obtained from at least one of: the metadata corpus 130, the literature corpus 140, and client devices 180. The lexicographical analysis module 122 takes the text of an electronic book stored in the literature corpus 140 as input. The text of the book is analyzed and numerical representations of the prevalence and importance of words and phrases included therein are automatically generated and outputted. One example of a system that does this is the "common terms and phrases" word cloud function provided by GOOGLEBOOKS™ that uses a term frequency-inverse document frequency (tf-idf) algorithm to determine metrics for the relative importance of words within a book and present this data to the user in a graphical format.

The output from the lexicographical analysis module 122 is routed to the machine learning module 126. The machine learning module 126 is initially calibrated using a training set of books that has been pre-categorized by a human operator. For example, in order to develop an algorithm for automatically identifying singularity science fiction books, the human operator analyzes a training set of books and splits them into two groups, those that are, and those that are not, singularity science fiction. The human operator then develops an initial algorithm for identifying the singularity science fiction books based on words that appear commonly in the lexicon of those books, but not in the other books of the training set. The initial algorithm is then applied to the training set and automatically improved based on books correctly and incorrectly identified. In one embodiment, a Gaussian Mixture Model trained by an Expectation-Maximization algorithm is used (see, e.g., http://bengio.abracadoudou.com/lectures/old/tex_gmm.pdf). One of skill in the art will be aware of many such machine learning algorithms, any of which may be applied without deviating from the scope and spirit of this disclosure.

In one embodiment, the machine learning algorithm is considered completely trained at this point and applied to the entire literature corpus 140. Any books determined by the algorithm to meet the criteria for a specific classification (e.g., singularity science fiction) are marked as such with a metadata tag. In other embodiments, a feedback module 128 is used to continue to improve the machine learning algorithm.

In one such embodiment, one or more administrators of the metadata generation subsystem 120 perform regular audits of generated metadata. A feedback module 128 is configured to provide an administrator interface that presents a selection of newly generated classifications and prompts the administrator to determine and indicate whether the classification is correct. The administrator's determination is then passed to the machine learning module 126 and the machine learning algorithm is automatically adjusted as appropriate. If the administrator determined that the classification is incorrect, the metadata associated with the book is also adjusted accordingly.

In another such embodiment, the output of the machine learning algorithm is "crowd sourced" with end users being invited to vote on client devices 180 as to whether an automatically generated metadata classification is correct or incorrect. If more than a threshold proportion of voters indicate a classification to be incorrect (e.g., 60%) then the feedback module 128 removes that classification from the book and notifies the machine learning module 126 that the book was incorrectly classified. The machine learning module 126 then automatically updates the machine learning algorithm to reflect that the previous classification was adjudged to be incorrect. Thus, user feedback can be used to generate a large amount of input data to improve the accuracy of the machine learning algorithm.

The metadata analysis module 124 takes existing metadata and other data relating to a book as input. The input is analyzed to generate new metadata that corresponds to the book. In some embodiments, user behavior data is collected for multiple users reading a specific book and then combined in some manner to produce typical behavior statistics associated with that book. For example, in some embodiments numerical representations of user behavior are generated, e.g., the average number of sittings it takes a user to complete the book, the average length of a sitting for a user reading the book, the percentage of users that complete the book, and the average length of time it takes users to complete the book. In one such embodiment, all users are notified of the intention to collect this usage data and given the opportunity to opt out before any such data is collected.

In other embodiments, market data relating to a book is collected from vendors. For example, in one such embodiment, the system automatically adds metadata tagging a book as a current best-seller when the book is present on a best-sellers list, and automatically updates the metadata to indicate that the book is a former best-seller once it drops off the best-sellers list. In another such embodiment, a metadata classification is associated with a book identifying it as popular in libraries responsive to vendors receiving a large number of orders from libraries. Alternatively, a book is marked as popular in libraries responsive to an analysis of on-line library catalogues indicating it is present in at least a threshold percentage of such catalogues. Further examples of market data relating to a book that can be used to generate new metadata include: how regularly the book is purchased as a gift, how many people have purchased/obtained the book, user ratings provided via the feedback module 128, how regularly the book is shared/referenced on social networking websites, and metrics representing a level of discussion of the book on the Internet (e.g., Is the book commonly discussed? Is there general agreement or is the book contentious? etc.). In one embodiment, a machine learning algorithm is trained and then applied to comments made about a book on the internet, using the prevalence of key words and phrases such as "I disagree" and "you're wrong" to determine how contentious the book is.

The client devices 180 can be any computing device capable of downloading media objects from the cloud provider facility 110. For example, in the embodiment shown where the cloud provider facility 110 is configured to provide metadata relating to electronic books, the client devices 180 are computing devices configured to act as electronic book readers. In other embodiments, the cloud provider facility provides one or more other types of media objects, for example music, video, and/or images. In related embodiments, the cloud provider facility 110 is an online store from which users purchase physical copies of the media objects (e.g., paper books, CDs, DVDs, etc.); in such cases the client devices 180 are computing devices running web-browsing software that enables the user to view the generated metadata and purchase media objects of interest.

Although only three client devices 180 are shown, in practice, many more (e.g., thousands or millions of) such devices will connect to the cloud provider facility 110 via a network 170. The network 170 is typically the Internet, but can be any network, including but not limited to any combination of a LAN, a MAN, a WAN, a mobile, a wired or wireless network, a private network, or a virtual private network. The cloud provider facility may be implemented using one or more computing devices, for example, in one embodiment a first server stores the metadata and literature corpora (130 and 140, respectively) and a second server performs the functions associated with the metadata generation subsystem 120.

Exemplary Method

Figure 2:
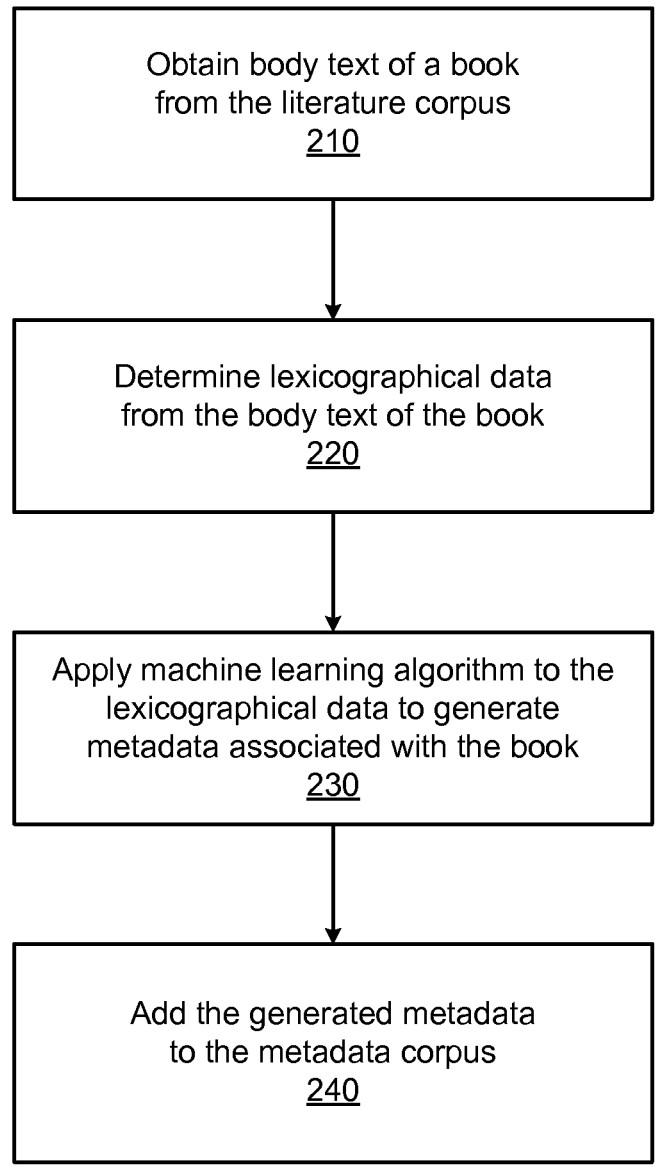
FIG. 2 is a high-level block diagram illustrating an exemplary method for generating metadata.

FIG. 2 is a high-level flow diagram illustrating an exemplary method for automatically generating new metadata from the full text of a book. In one embodiment, the method is performed by one or more servers in a cloud provider facility 110. In another embodiment, the method is performed individually by client devices 180. One of skill in the art will recognize that similar methods for generating metadata about a media object that take a wide range of data as input are possible without deviating from the spirit and scope of what is disclosed herein. The precise nature of the metadata generated will depend on the type of media object, the intended application, and the existing available data about the object.

The body text of the book is obtained from the literature corpus 140 (step 210). In one embodiment this involves downloading the body text from a database or repository. In another embodiment the text is already present on the computing device executing the method. The use of the term "literature corpus" should not be taken as limiting the scope of the method to embodiments where a large volume of book texts are stored at a single location; the literature corpus 140 may be distributed across many cloud provider facilities and/or client devices 180.

Lexicographical data of determined by analysis of the body text (step 220). In one embodiment, the data comprises counts of the number of instances of every word that occurs at least once in the book. In another embodiment, a tf-idf algorithm is used to calculate a score for each word that appears in the book.

A machine learning algorithm is applied to the determined lexicographical data (step 230). The machine learning algorithm takes the lexicographical data as input and outputs metadata corresponding to the book's text. In one embodiment, the metadata indicates one or more sub-genres that are likely to correspond to the book (e.g., singularity science fiction, romance with limited sex scenes, etc.). In another embodiment, the metadata indicates a target demograph, i.e., a combination of one or more indicators, including: age range, geographic location, education level, interests, etc. For example, a book containing a high number of instances of the words "baseball" and "Gehrig" could be tagged as being of particular interest to "sports fans in New York." Once the metadata has been generated, it is added to the metadata corpus 130 (step 240).

Computing System Architecture

Figure 3:
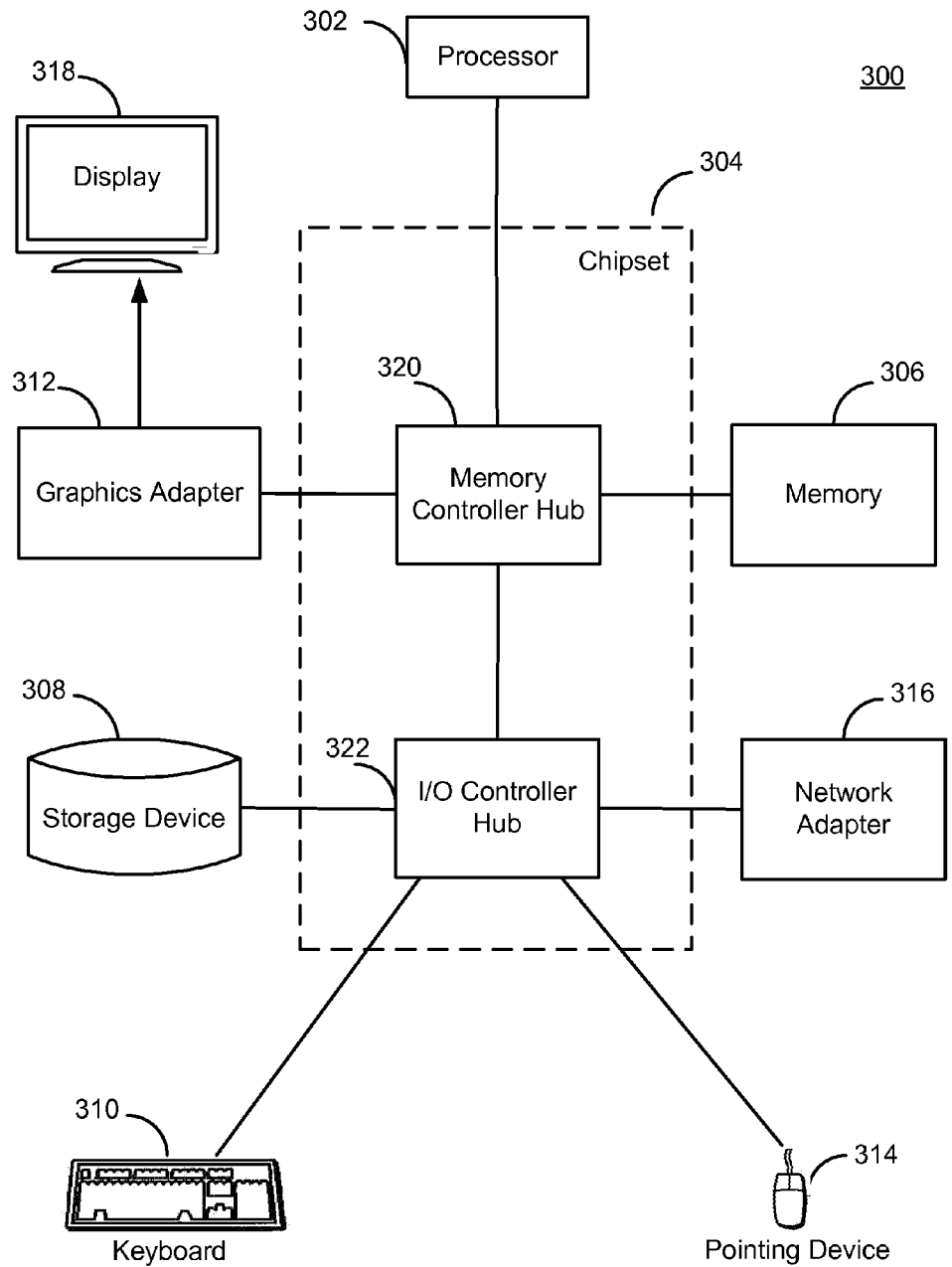
FIG. 3 is a high-level block diagram illustrating an example of a computer for use in the computing environment shown in FIG. 1.

The entities and processes shown in FIG. 1 are implemented using one or more computers. FIG. 3 is a high-level block diagram illustrating an example computer 300. The computer 300 includes at least one processor 302 coupled to a chipset 304. The chipset 304 includes a memory controller hub 320 and an input/output (I/O) controller hub 322. A memory 306 and a graphics adapter 312 are coupled to the memory controller hub 320, and a display 318 is coupled to the graphics adapter 312. A storage device 308, keyboard 310, pointing device 314, and network adapter 316 are coupled to the I/O controller hub 322. Other embodiments of the computer 300 have different architectures.

The storage device 308 is a non-transitory computer-readable storage medium such as a hard drive, compact disk read-only memory (CD-ROM), DVD, or a solid-state memory device. The memory 306 holds instructions and data used by the processor 302. The pointing device 314 is a mouse, track ball, or other type of pointing device, and is used in combination with the keyboard 310 to input data into the computer system 300. The graphics adapter 312 displays images and other information on the display 318. The network adapter 316 couples the computer system 300 to one or more computer networks.

The computer 300 is adapted to execute computer program modules for providing functionality described herein. In one embodiment, program modules are stored on the storage device 308, loaded into the memory 306, and executed by the processor 302.

The types of computers used by the entities and processes of FIGS. 1 and 2 can vary depending upon the embodiment and the processing power required by the entity. For example, the literature corpus might be stored in a distributed database system comprising multiple blade servers working together to provide the functionality described herein. The computers can lack some of the components described above, such as keyboards 210, graphics adapters 212, and displays 218.

Additional Considerations

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors included as part of the computing environment 100. Alternatively, hardware or software modules may be stored elsewhere within computing environment 100. The computing environment 100 includes hardware elements necessary for the operations described here, including one or more processors, high speed memory, hard disk storage and backup, network interfaces and protocols, input devices for data entry, and output devices for display, printing, or other presentations of data.

Numerous variations from the system architecture of the illustrated computing environment 100 are possible. The components of the computing environment 100 and their respective functionalities can be combined or redistributed. For example, a machine learning module 126 may be executed individually on each of the client devices 180, and thus the machine learning algorithm that is developed will be specifically tailored to local usage on each individual client device 180.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for electronically generating metadata relating to a media object. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method, system, and storage medium disclosed herein without departing from the spirit and scope as defined in the appended claims.

What is claimed is:

1. A method for generating metadata relating to a book, the book including body text, the method comprising:
    determining input data relating to the book, the input data comprising lexicographical data determined from the body text;
    applying a machine learning algorithm to the lexicographical data using a processor, the machine learning algorithm generating new metadata; and
    recording a correspondence between the new metadata and the book.

2. The method of claim 1, wherein the lexicographical data comprises a count of a number of times a first word appears in the body text.

3. The method of claim 1, wherein the lexicographical data comprises a score for a first word determined by comparing a number of times the first word appears in the body text with a number of times the first word appears in a corpus of books.

4. The method of claim 3, wherein the score for the first word is determined using a term frequency-inverse document frequency algorithm.

5. The method of claim 1, wherein the metadata indicates a genre.

6. The method of claim 1, wherein the metadata indicates a target demograph.

7. The method of claim 1, wherein the machine learning algorithm uses a Gaussian Mixture Model.

8. The method of claim 1, wherein the machine learning algorithm is an expectation-maximum trained algorithm.

9. The method of claim 1, further comprising:
    collecting feedback relating to the correspondence; and
    modifying the correspondence responsive to the feedback.

10. The method of claim 9, wherein the feedback is provided by an administrator of a literature corpus of which the book is a part.

11. The method of claim 9, wherein the feedback is collected from a plurality of end-users.

12. The method of claim 11, wherein modifying comprises removing the correspondence responsive to more than a threshold proportion of the feedback indicating the correspondence is incorrect.

13. A method for generating metadata relating to a media object, the method comprising:
    determining input data relating to the media object, the input data based on the content of the media object and existing metadata associated with the media object;
    applying a machine learning algorithm to the input data using a processor, the machine learning algorithm generating new metadata; and
    recording a correspondence between the new metadata and the media object.

14. The method of claim 13, wherein the media object is a digital music file.

15. The method of claim 13, wherein the media object is a video.

16. The method of claim 13, wherein the media object is a book.

17. The method of claim 16, wherein the new metadata includes at least one of: a proportion of users that complete the book after starting it; an average amount of time taken to complete the book; an average amount of time users spend reading the book in a single sitting; and an average number of sittings it takes for a user to complete the book.

18. The method of claim 13, wherein the existing metadata comprises at least one of: user behavior data and market data.

19. The method of claim 18, wherein market data comprises information regarding at least one of: inclusion of the media object in a library catalogue; purchase of the media object as a gift; the media object's presence on a current popularity chart; sharing of the media object on social networking sites; and a metric indicating a level of discussion of the media object.

20. A system for generating metadata relating to a media object, the system comprising:
    a content analysis module configured to determine input data, the input data comprising content data determined by analyzing content of the media object;
    a machine learning module, configured to generate new metadata responsive to the input data; and
    metadata storage, configured to receive the new metadata and store the new metadata as well as a correspondence between the new metadata and the media object.

21. The system of claim 20, further comprising a feedback module, configured to collect feedback relating to the correspondence, wherein the metadata storage is further configured to modify the correspondence responsive to the feedback.

22. The system of claim 21, wherein modifying the correspondence comprises removing the correspondence responsive to more than a threshold proportion of the feedback indicating the correspondence is incorrect.

23. The system of claim 20, further comprising a metadata analysis module, wherein the input data further comprises additional data, and the metadata analysis module is configured to determine the additional data by analyzing existing metadata associated with the media object.

24. The system of claim 23, wherein the existing metadata comprises at least one of: user behavior data; and market data.

25. The system of claim 24, wherein market data comprises information regarding at least one of: inclusion of the media object in a library catalogue; purchase of the media object as a gift; the media object's presence on a current popularity chart; sharing of the media object on social networking sites; and a metric indicating a level of discussion of the media object.

26. The system of claim 20, wherein the media object is a book, and the content comprises body text.

27. The system of claim 26, wherein the content data comprises a score for a first word, the score determined by comparing a number of times the first word appears in the body text with a number of times the first word appears in a corpus of books.

28. The system of claim 26, wherein the new metadata includes at least one of: a genre; a target demograph; a proportion of users that complete the book after starting it; an average amount of time taken to complete the book; an average amount of time users spend reading the book in a single sitting; and an average number of sittings it takes for a user to complete the book.

29. A non-transitory computer readable medium configured to store instructions, the instructions when executed by a processor cause the processor to:
   determine input data relating to the media object, the input data based on the content of the media object and existing metadata associated with the media object;
   apply a machine learning algorithm to the input data using a processor, the machine learning algorithm generating new metadata; and
   record a correspondence between the new metadata and the media object.

30. The computer readable medium of claim 29, further comprising instructions to:
   collect feedback relating to the correspondence; and
   modify the correspondence responsive to the feedback.

31. The computer readable medium of claim 30, wherein the feedback is collected from a plurality of end-users.

32. The computer readable medium of claim 31, where the instructions to modify comprise instructions to remove the correspondence responsive to more than a threshold proportion of the feedback indicating the correspondence is incorrect.

33. The computer readable medium of claim 32, wherein the existing metadata comprises at least one of: user behavior data; and market data.

34. The computer readable medium of claim 33, wherein market data comprises information regarding at least one of: inclusion of the media object in a library catalogue; purchase of the media object as a gift; the media object's presence on a current popularity chart; sharing of the media object on social networking sites; and a metric indicating a level of discussion of the media object.

35. The computer readable medium of claim 29, wherein the media object is a book, and the content comprises body text.

36. The computer readable medium of claim 35, wherein the content data comprises a score for a first word, the score determined by comparing a number of times the first word appears in the body text with a number of times the first word appears in a corpus of books.

37. The computer readable medium of claim 35, wherein the new metadata includes at least one of: a genre; a target demograph; a proportion of users that complete the book after starting it; an average amount of time taken to complete the book; an average amount of time users spend reading the book in a single sitting; and an average number of sittings it takes for a user to complete the book.

* * * * *